(12) United States Patent
Zhang et al.

(10) Patent No.: US 10,117,295 B2
(45) Date of Patent: Oct. 30, 2018

(54) LED LIGHTING APPARATUS FOR USE WITH AC-OUTPUT LIGHTING BALLASTS

(71) Applicant: Cree, Inc., Durham, NC (US)

(72) Inventors: Jun Zhang, Cary, NC (US); James Andrew McBryde, Raleigh, NC (US)

(73) Assignee: Cree, Inc., Durham, NC (US)

( * ) Notice: Subject to any disclaimer, the term of this patent is extended or adjusted under 35 U.S.C. 154(b) by 936 days.

(21) Appl. No.: 13/749,082

(22) Filed: Jan. 24, 2013

(65) Prior Publication Data

US 2014/0203714 A1   Jul. 24, 2014

(51) Int. Cl.
*H05B 33/08* (2006.01)

(52) U.S. Cl.
CPC ........ *H05B 33/0809* (2013.01); *Y02B 20/342* (2013.01); *Y02B 20/348* (2013.01); *Y02B 20/383* (2013.01)

(58) Field of Classification Search
CPC .... H05B 37/02; H05B 33/08; H05B 33/0809; H05B 33/0812; H05B 33/0842; Y02B 20/342; Y02B 20/348; Y02B 20/383
USPC ........ 315/185 R, 200 R, 244, 246, 254, 258, 315/312
See application file for complete search history.

(56) References Cited

U.S. PATENT DOCUMENTS

| 3,283,169 A | 11/1966 | Libaw |
| 4,210,846 A | 7/1980 | Capewell et al. |
| 4,213,064 A | 7/1980 | Nagano |
| 4,392,089 A | 7/1983 | Lester et al. |
| 4,506,195 A | 3/1985 | Elms |
| 4,540,917 A | 9/1985 | Luchaco et al. |
| 4,560,908 A | 12/1985 | Stupp et al. |
| 4,682,147 A | 7/1987 | Bowman |
| 4,890,004 A | 12/1989 | Beckerman |

(Continued)

FOREIGN PATENT DOCUMENTS

| CN | 101105285 A | 1/2008 |
| CN | 101778522 A | 7/2010 |

(Continued)

OTHER PUBLICATIONS

Ribarich; *Driver—Off-Line LED Control Circuit*; LED Professional Review; Jan./Feb. 2009; pp. 21-24.

(Continued)

*Primary Examiner* — Jimmy Vu
(74) *Attorney, Agent, or Firm* — Myers Bigel, P.A.

(57) ABSTRACT

A lighting apparatus includes at least one light emitting diode (LED) and a passive resonant converter circuit having an output coupled to the at least one LED and an input configured to be coupled to a ballast that produces an AC output. The passive resonant converter circuit may include a combination of a passive rectifier circuit, such as a passive diode bridge, and a resonant circuit, such as a CL resonant circuit. An input of the passive rectifier circuit may be configured to be coupled to the ballast and the resonant circuit and the at least one LED may be coupled to an output of the passive rectifier circuit. At least a portion of the passive resonant converter may be packaged with the at least one LED in a lamp and all or a portion of the passive resonant converter circuit may be packaged as a module or other unit for use with a lamp.

32 Claims, 9 Drawing Sheets

(56) References Cited

U.S. PATENT DOCUMENTS

| | | |
|---|---|---|
| 5,151,679 A | 9/1992 | Dimmick |
| 5,404,082 A | 4/1995 | Hernandez et al. |
| 5,408,403 A | 4/1995 | Nerone et al. |
| 5,466,992 A | 11/1995 | Nemirow et al. |
| 5,488,269 A | 1/1996 | El-Hamamsy et al. |
| 5,598,326 A | 1/1997 | Liu et al. |
| 5,734,230 A | 3/1998 | Edwards et al. |
| 5,739,639 A | 4/1998 | Johnson |
| 5,808,417 A | 9/1998 | Ference et al. |
| 5,847,550 A | 12/1998 | Schie et al. |
| 5,895,986 A | 4/1999 | Walters et al. |
| 5,925,990 A | 7/1999 | Crouse et al. |
| 6,051,938 A | 4/2000 | Arts et al. |
| 6,069,453 A | 5/2000 | Arts et al. |
| 6,124,678 A | 9/2000 | Bishop et al. |
| 6,320,330 B1 | 11/2001 | Haavisto et al. |
| 6,333,605 B1 | 12/2001 | Grouev et al. |
| 6,362,575 B1 | 3/2002 | Chang et al. |
| 6,411,045 B1* | 6/2002 | Nerone ............... H02M 7/538 315/185 R |
| 6,507,157 B1 | 1/2003 | Erhardt et al. |
| 6,509,657 B1 | 1/2003 | Wong et al. |
| 6,822,426 B1 | 11/2004 | Todd et al. |
| 6,936,968 B2 | 8/2005 | Cross et al. |
| 7,027,010 B2 | 4/2006 | Lee |
| 7,067,992 B2 † | 6/2006 | Leong |
| 7,088,059 B2 | 8/2006 | McKinney et al. |
| 7,138,994 B2 | 11/2006 | Cho et al. |
| 7,456,588 B2 | 11/2008 | Alexandrov |
| 7,507,001 B2 | 3/2009 | Kit |
| 7,511,971 B2 | 3/2009 | Lim |
| 7,863,828 B2 | 1/2011 | Melanson |
| 7,863,832 B2 | 1/2011 | Lane et al. |
| 7,911,149 B2 | 3/2011 | Schaible et al. |
| 8,089,213 B2 † | 1/2012 | Park |
| 8,310,172 B2 | 11/2012 | Negrete |
| 8,322,878 B2 † | 12/2012 | Hsia |
| 8,358,056 B2 | 1/2013 | Park |
| 8,461,794 B2 | 6/2013 | Schrod et al. |
| 8,487,551 B1 | 7/2013 | Chen et al. |
| 9,237,625 B1 | 1/2016 | Mays, II et al. |
| 9,357,599 B2 | 5/2016 | Tomiyama et al. |
| 2002/0101362 A1 | 8/2002 | Nishimura |
| 2003/0057888 A1 | 3/2003 | Archenhold et al. |
| 2003/0081439 A1 | 5/2003 | Doss et al. |
| 2003/0117084 A1 | 6/2003 | Stack |
| 2003/0193245 A1 | 10/2003 | Powers |
| 2003/0197477 A1 | 10/2003 | Hsieh |
| 2004/0155627 A1 | 8/2004 | Stanesti et al. |
| 2004/0170015 A1 | 9/2004 | Hamrick |
| 2004/0178766 A1 | 9/2004 | Bucur et al. |
| 2004/0192407 A1 | 9/2004 | Formenti |
| 2004/0217737 A1 | 11/2004 | Popescu |
| 2005/0029966 A1 | 2/2005 | Buonocunto |
| 2005/0068459 A1 | 3/2005 | Holmes et al. |
| 2005/0082989 A1 | 4/2005 | Jones et al. |
| 2005/0135103 A1 | 6/2005 | Evans |
| 2005/0156568 A1 | 7/2005 | Yueh |
| 2005/0162101 A1* | 7/2005 | Leong ..................... F21K 9/00 315/291 |
| 2005/0200308 A1 | 9/2005 | Rimmer et al. |
| 2005/0243022 A1 | 11/2005 | Negru |
| 2006/0038803 A1 | 2/2006 | Miller et al. |
| 2006/0066258 A1 | 3/2006 | Lane et al. |
| 2007/0138972 A1 | 6/2007 | Siessegger |
| 2007/0152604 A1 | 7/2007 | Tatsumi |
| 2007/0182338 A1 | 8/2007 | Shteynberg et al. |
| 2007/0273290 A1 | 11/2007 | Ashdown et al. |
| 2008/0055077 A1 | 3/2008 | Lane et al. |
| 2008/0122376 A1 | 5/2008 | Lys |
| 2008/0224617 A1 | 9/2008 | Keller et al. |
| 2008/0258628 A1 | 10/2008 | Higley et al. |
| 2008/0265981 A1 | 10/2008 | Niessen et al. |
| 2008/0266849 A1 † | 10/2008 | Nielson |
| 2008/0276509 A1 | 11/2008 | Yu |
| 2008/0295371 A1 | 12/2008 | Hsu |
| 2009/0033239 A1 | 2/2009 | Gwisdalla et al. |
| 2009/0085490 A1 | 4/2009 | Awalt et al. |
| 2009/0128057 A1 | 5/2009 | Valdez |
| 2009/0296384 A1 | 12/2009 | Van de Ven et al. |
| 2010/0020527 A1 | 1/2010 | Fiermuga |
| 2010/0072902 A1 | 3/2010 | Wendt et al. |
| 2010/0079091 A1 | 4/2010 | Deixler et al. |
| 2010/0096976 A1* | 4/2010 | Park ......................... 313/498 |
| 2010/0109560 A1 | 5/2010 | Yu et al. |
| 2010/0135000 A1 | 6/2010 | Smith, III et al. |
| 2010/0164399 A1 | 7/2010 | Radermacher et al. |
| 2010/0194296 A1 | 8/2010 | Park |
| 2010/0237840 A1 | 9/2010 | Walter et al. |
| 2010/0244569 A1 | 9/2010 | Chandler et al. |
| 2010/0244707 A1 | 9/2010 | Gaines et al. |
| 2010/0244981 A1 | 9/2010 | Gorbachov |
| 2010/0259239 A1 | 10/2010 | Shi et al. |
| 2010/0270941 A1 | 10/2010 | Hui |
| 2010/0271802 A1 | 10/2010 | Recker et al. |
| 2010/0277070 A1 | 11/2010 | Butteris et al. |
| 2010/0301751 A1 | 12/2010 | Chobot et al. |
| 2011/0006691 A1 | 1/2011 | Blaha et al. |
| 2011/0043035 A1 | 2/2011 | Yamada et al. |
| 2011/0043127 A1 | 2/2011 | Yamasaki |
| 2011/0043136 A1 | 2/2011 | Radermacher |
| 2011/0057572 A1 | 3/2011 | Kit et al. |
| 2011/0062888 A1 | 3/2011 | Bondy et al. |
| 2011/0080116 A1 | 4/2011 | Negley et al. |
| 2011/0109164 A1 | 5/2011 | Mohammed Suhura et al. |
| 2011/0121654 A1 | 5/2011 | Recker et al. |
| 2011/0121754 A1 | 5/2011 | Shteynberg et al. |
| 2011/0121756 A1 † | 5/2011 | Thomas |
| 2011/0140611 A1 | 6/2011 | Elek et al. |
| 2011/0140612 A1 | 6/2011 | Mohan et al. |
| 2011/0232143 A1 | 9/2011 | Hsu |
| 2011/0254461 A1 | 10/2011 | Summerland et al. |
| 2011/0291582 A1* | 12/2011 | Wei ................... H05B 33/0821 315/254 |
| 2011/0309760 A1 | 12/2011 | Beland et al. |
| 2012/0008315 A1 | 1/2012 | Simon et al. |
| 2012/0153854 A1 | 6/2012 | Setomoto et al. |
| 2012/0161666 A1* | 6/2012 | Antony ............. H05B 33/0809 315/294 |
| 2012/0242241 A1 | 9/2012 | Schmacht |
| 2012/0274237 A1 | 11/2012 | Chung et al. |
| 2012/0280637 A1 | 11/2012 | Tikkanen et al. |
| 2012/0286668 A1 | 11/2012 | Kondo |
| 2012/0306403 A1 | 12/2012 | Chung et al. |
| 2012/0313520 A1 | 12/2012 | Canter et al. |
| 2013/0020951 A1* | 1/2013 | Pollock ............. H05B 33/0809 315/186 |
| 2013/0043803 A1 | 2/2013 | Raj |
| 2013/0049613 A1* | 2/2013 | Reed ................. H05B 33/0809 315/185 R |
| 2013/0063027 A1 | 3/2013 | Recker et al. |
| 2013/0113390 A1 | 5/2013 | Oh et al. |
| 2013/0119868 A1 | 5/2013 | Saxena et al. |
| 2013/0214697 A1 | 8/2013 | Archenhold |
| 2013/0313983 A1 | 11/2013 | Radermacher |
| 2014/0132164 A1 † | 5/2014 | McBryde |
| 2014/0152184 A1 | 6/2014 | Tomiyama et al. |
| 2014/0203714 A1 | 7/2014 | Zhang et al. |
| 2014/0204571 A1 | 7/2014 | Zhang et al. |
| 2014/0300655 A1 | 10/2014 | Kato |
| 2015/0008844 A1 | 1/2015 | Wilson |
| 2015/0015076 A1 | 1/2015 | Park |
| 2015/0015145 A1 | 1/2015 | Carrigan et al. |
| 2015/0021988 A1 | 1/2015 | Barnetson et al. |
| 2015/0048685 A1 | 2/2015 | Wilson |
| 2015/0091463 A1 | 4/2015 | Jin |

FOREIGN PATENT DOCUMENTS

| | | |
|---|---|---|
| CN | 102155644 A | 8/2011 |
| CN | 102278722 A | 12/2011 |
| EP | 2 178 345 A2 | 4/2010 |
| EP | 2 288 237 A2 | 2/2011 |

(56) References Cited

FOREIGN PATENT DOCUMENTS

| | | |
|---|---|---|
| EP | 2 432 297 A2 | 3/2012 |
| JP | 2011-150852 A | 8/2011 |
| WO | WO 2009/010802 A2 | 1/2009 |
| WO | WO 2009/136322 A1 | 11/2009 |
| WO | WO 2010/127366 A2 | 11/2010 |
| WO | WO 2010/139080 A1 | 12/2010 |
| WO | WO 2011/124721 A1 | 10/2011 |
| WO | WO 2013/124827 A1 | 2/2012 |
| WO | WO 2012/104800 A2 | 8/2012 |
| WO | WO 2012/110973 A1 | 8/2012 |
| WO | 2014115010 A1 † | 7/2014 |
| WO | WO 2014/115010 A1 | 7/2014 |

OTHER PUBLICATIONS

International Search Report and Written Opinion Corresponding to International Application No. PCT/US2014/060594; dated Jan. 16, 2015; 9 Pages.

Notification of Transmittal of the International Search Report and the Written Opinion of the International Searching Authority, or the Declaration, PCT/US13/68904, dated Mar. 19, 2014, 9 pages.

Notification of Transmittal of the International Search Report and the Written Opinion of the International Searching Authority, or the Declaration, PCT/US13/68910, dated Apr. 4, 2014, 13 pages.

Notification of Transmittal of the International Search Report and the Written Opinion of the International Searching Authority, or the Declaration, PCT/US13/68905, dated Apr. 7, 2014, 12 pages.

AC Film Capacitors in Connection with Mains, Jan. 7, 2009, pp. 301-303, Vishay Intertechnology, Inc., http://www.eetaiwan.com/STATIC/PDF/200903/20090304_Vishay_AN02.pdf?SOURCES=DOWNLOAD.

Capacitor-Input filter, Dec. 4, 2012, http://en.wikipedia.org/w/index.php?title=Capacitor-input_filter&oldid=526350197.

Chan, Design of Differential Filters for High-Speed Signal Chains, Application Report SLWA053B, Apr. 2010, http://www.ti.com/lit/an/slwa053b/slwa053b.pdf47.

Chen, A Driving Technology for Retrofit LED Lamp for Fluorescent Lighting Fixtures with Electronic Ballasts, pp. 588-601, IEEE Trans. on Power Electronics, vol. 26:2, (Feb. 2011).

Impedance Matching, Nov. 16, 2012, http://en.wikipedia.org/w/index.php?title-impedance_matching&oldid-523347621.

Johnson, Brant. EETimes, Controlling power and cost for multiple LEDs, Texas Instruments, Nov. 6, 2006.

Lee, Robust Passive LED Driver Compatible with Conventional Rapid-Start Ballast, pp. 3694-3706, Dec. 2011, IEEE Trans. on Power Electronics, vol. 26:12.

Pyakuryal et al., Filter Design for AC to DC Converter, vol. 2:6, pp. 42-49, Jun. 22, 2013, IRJES, http://www.irjes.com/Papers/vol2-issue6/Version-1,E02064249.pdf.

The Inductor, p. 3, Nov. 20, 2012, http://www.talkingelectronics.com/projects/inductor/inductor-3.html.

Vitanza A. et al., Electronic Fluorescent Lamp Ballast, pp. 1-10, 1999, STMicroelectronics Application Note AN427/1294, http://www.st.com/static/acdtive/cn/resource/technical/document/application_note/CD00003901.pdf.

International Preliminary Report on Patentability Corresponding to International Application No. PCT/US2013/068910; dated May 28, 2015; 12 Pages.

Capacitor-Input Filter, Dec. 12, 2011, http://en.wikipedia.org/w/index.php?title=Capacitor-input_filter&oldid=465397872.

Kuphaldt T. Lessons in Electric Circuits, vol. II-AC, Chapter 7: Mixed-Frequency AC Signals, Chapter 9: Transformers, pp. 153-188, 217-281, Jul. 25, 2007, http://www.lbiblio.org/kuphaldt/electricCircuits/AC/AC.pdf.

Malvino et al. 2008, Basic Electronics (MSBTE), 3-12 Series Inductor Filter, pp. 94-95, Tata McGraw-Hill Company Limited.

Niknejad A., Electromagnetics for High-Speed Analog and Digital Communication Circuit, Chapter 7: Resonance and Impedance Matching, Chapter 10: Transformers, pp. 168-200, 293-319, 2007, Cambridge University Press.

Zhu et al. "Novel Capacitor-Isolated Power Converter", pp. 1824-1829, Sep. 2010, Energy Conversion Congress and Exposition (ECCE), 2010 IEEE held in Atlanta, GA.

Third Party Submission Filed on Apr. 17, 2015 Corresponding to U.S. Appl. No. 14/256,573, 9 pages.

Third Party Submission Filed on Apr. 21, 2015 Corresponding to U.S. Appl. No. 13/943,455, 26 pages.

Third Party Submission Filed on Jun. 4, 2015 Corresponding to U.S. Appl. No. 14/256,573, 12 pages.

Third Party Submission Filed on Apr. 16, 2015 Corresponding to U.S. Appl. No. 13/943,455, 26 pages.

Third Party Submission Filed on Apr. 20, 2015 Corresponding to U.S. Appl. No. 13/943,455, 13 pages.

Chen N. et al., "A Driving Technology for Retrofit LED Lamp for Fluorescent Lighting Fixtures With Electronic Ballasts", *IEEE Transactions on Power Electronics*, vol. 26, No. 2, Feb. 2011, 588-601.

International Search Report and Written Opinion Corresponding to International Application No. PCT/US12/68987; dated Feb. 26, 2013; 14 Pages.

International Search Report Corresponding to International Application No. PCT/US2012/069126; dated Feb. 20, 2013; 17 Pages.

International Search Report Corresponding to International Application No. PCT/US12/68991; dated Mar. 4, 2013; 10 Pages.

Invitation to Pay Additional Fees Corresponding to International Application No. PCT/US12/68984; dated Feb. 1, 2013; 2 Pages.

Johnson B., "Controlling power and cost for multiple LEDs", *EE Times*, Nov. 5, 2006, Retrieved on Feb. 6, 2013 from URL, http://eetimes.com/design/power-management-design/4012121/Controlling-power-and-cost-for-multiple-LEDs?pageNumber.

Notification of Transmittal of the International Search Report and the Written Opinion of the International Searching Authority, or the Declaration, PCT/US12/68984, dated May 10, 2013.

Taiwanese Office Action Corresponding to Application No. 103135868; dated Nov. 24, 2015; Foreign Text, 12 Pages.

European Search Report Corresponding to European Patent Application No. 12 85 7833; dated Nov. 20, 2015; 9 Pages.

European Search Report Corresponding to European Patent Application No. 12 85 8507; dated Nov. 30, 2015; 7 Pages.

International Preliminary Report on Patentability Corresponding to International Application No. PCT/US2013/068905; dated Jul. 28, 2015, 11 Pages.

Chinese First Office Action and Search Report Corresponding to Chinese Application No. 201380066784.1; dated Mar. 18, 2016; Foreign Text, 11 Pages, English Translation Thereof, 6 Pages.

International Preliminary Report on Patentability, Corresponding to International Application No. PCT/US2014/060594; dated Apr. 28, 2016; 7 Pages.

European Search Report Corresponding to European Patent Application No. 13 87 2794; dated Oct. 18, 2016; 8 Pages.

European Search Report Corresponding to European Patent Application No. 12 85 7535; dated Jul. 7, 2016; 8 Pages.

European Search Report Corresponding to European Patent Application No. 13 87 3105; dated Jul. 12, 2016; 7 Pages.

Chinese Office Action Corresponding to Chinese Patent Application No. 201380071192.9; dated May 12, 2017; Foreign Text, 15 Pages, English Translation Thereof, 14 Pages.

Horowitz et al., The Art of Electronics, p. 32, 1989, Cambridge University Press, Cambridge.†

Zhu et al, Novel Capacitor-Isolated Power Converter, pp. 1824-1829, Sep. 2010, Energy Conversion Congress and Exposition (ECCE), 2010 IEEE held in Atlanta, GA.†

Galvanic Isolation, Sep. 12, 2011, http://en.wikipedia.org/w/index.php?title-Galvanic_isolation&oldid=449965801.†

Zhang et al., A Capacitor-Isolated LED Driver with Inherent Current Balance Capability, pp. 1708-1716, Apr. 2012, IEEE Trans. Indust. Electronics vol. 59.†

Tony Kuphaldt, Lessons in Electric Circuits, vol. II-AC, Chapter 7: Mixed-Frequency AC Signals, Chapter 9: Transformers, pp. 153-188, 217-281, Jul. 25, 2007, http://www.ibiblio.org/kuphaldt/electricCircuits/AC/AC.pdf.†

(56) References Cited

OTHER PUBLICATIONS

Ali Niknejad, Electromagnetics for High-Speed Analog and Digital Communication Circuit, Chapter 7: Resonance and Impedance Matching, Chapter 10: Transformers, pp. 168-200, 293-319, 2007, Cambridge University Press, Cambridge.†

\* cited by examiner
† cited by third party

LED LIGHTING APPARATUS FOR USE WITH AC-OUTPUT LIGHTING BALLASTS

FIELD

The present inventive subject matter relates to lighting apparatus and methods and, more particularly, to solid-state lighting apparatus and methods.

BACKGROUND

Solid-state lighting arrays are used for a number of lighting applications. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are commonly used in lighting fixtures, including task lighting, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may be attractive for retrofit/replacement applications, where devices such as LEDs may offer improved energy efficiency, reduced heat generation, extended life and desired performance characteristics, such as certain color and/or color rendering capabilities. For example, LED bulbs are commonly used to replace incandescent bulbs in down lights and other applications to reduce energy consumption and increase time between replacements. LED-based replacements for fluorescent tubes have also been developed, as shown, for example, in U.S. Pat. No. 6,936,968, U.S. Pat. No. 7,507,001, and U.S. Patent Application Publication No. 2008/0266849, which describe various types of LED replacements for use in fluorescent light fixtures.

SUMMARY

Some embodiments provide a lighting apparatus including at least one light emitting diode (LED) and a passive resonant converter circuit having an output coupled to the at least one LED and an input configured to be coupled to a ballast that produces an AC output, such as high-frequency electronic ballasts used to drive gas-discharge lamps (e.g., fluorescent tubes, sodium vapor lamps, mercury vapor lamps and the like). In some embodiments, the passive resonant converter circuit may include a combination of a passive rectifier circuit, such as a passive diode bridge, and a resonant circuit, such as a CL resonant circuit. An input of the passive rectifier circuit may be configured to be coupled to the ballast. The resonant circuit and the at least one LED may be coupled to an output of the passive rectifier circuit. The apparatus may further include at least one capacitor configured to be coupled in series between the ballast and the passive resonant converter circuit, to provide blocking of low-frequency currents.

In some embodiments, the at least one LED and at least a portion of the passive resonant converter circuit may be integrated in a lamp. The apparatus may further include an isolation transformer configured to be coupled between the passive resonant converter circuit and the ballast. In some embodiments, the at least one LED and the passive resonant converter may be components of a lamp replacement kit.

Further embodiments of the inventive subject matter provide a lamp including a housing, at least one electrical contact supported by the housing and configured to engage at least one electrical contact in a lamp connector, at least one light emitting diode (LED) positioned in the housing, and a resonant circuit positioned in the housing and coupled to the at least one LED and to the at least one electrical contact. The lamp may further include a passive resonant converter circuit positioned in the housing and having an input coupled to the at least one electrical contact and an output coupled to the at least one LED, wherein the passive resonant converter circuit may include a combination of a passive rectifier circuit and the resonant circuit.

In some embodiments, an input of the passive rectifier circuit may be coupled to the at least one contact and the resonant circuit and the at least one LED may be coupled to an output of the passive rectifier circuit. The resonant circuit may include a resonant CL circuit including at least one inductor and at least one capacitor. The resonant CL circuit may include at least one inductor coupled in series with the at least one LED and at least one capacitor coupled in parallel with the at least one inductor and the at least one LED.

Still further embodiments of the inventive subject matter provide an apparatus including an output configured to be coupled to at least one LED, an input configured to be coupled to a ballast that produces an AC output, and a passive resonant converter circuit coupled to the input and to the output. The passive resonant converter circuit may include a combination of a passive rectifier circuit and a resonant circuit. In some embodiments, at least a portion of the passive resonant converter circuit may be packaged in a module configured to be electrically connected between the ballast and a lamp connector. In further embodiments, at least a portion of the passive resonant converter circuit may be packaged in a lamp including the at least one LED.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The present inventive subject matter may further relate to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

Figure 1:
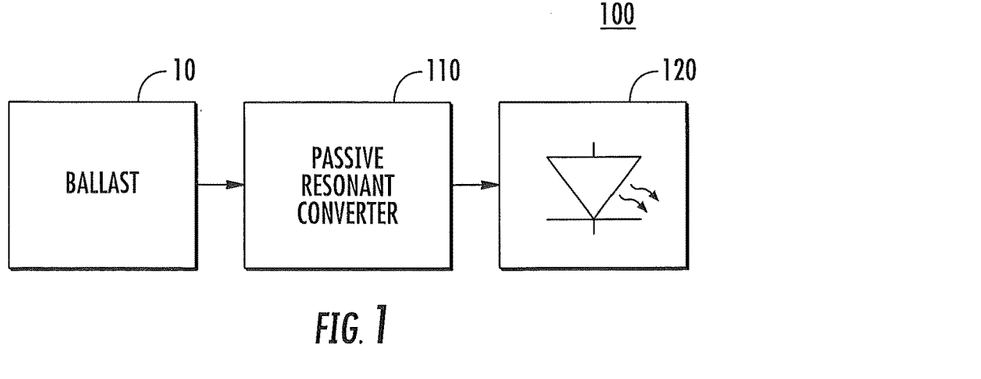
FIG. 1 is a schematic diagram illustrating a lighting apparatus according to some embodiments.

FIG. 1 illustrates a lighting apparatus 100 according to some embodiments of the inventive subject matter. The apparatus 100 includes at least one solid-state lighting device, here illustrated as at least one light emitting diode (LED) 120, which is configured to provide illumination in a light fixture or other configuration. The apparatus 100 further includes a passive resonant converter circuit 110, which has an input configured to be coupled to a lamp ballast 10, such as an electronic ballast as may be used in a fluorescent or other gas-discharge lighting device. For example, the ballast 10 may be one included in an existing fluorescent lighting fixture that is being retrofitted to use the at least one LED 120 as a replacement for at least one fluorescent tube or compact fluorescent lamp (CFL). The passive resonant converter circuit 110 has an output coupled to the at least one LED 120. In various embodiments, for example, the passive resonant converter circuit 110 may be a passive resonant rectifier configured to provide a rectified and filtered AC current through the at least one LED 120 from a high-frequency AC input generated by the ballast 10. The passive resonant converter circuit 110 may be configured to provide current to the at least one LED 120 without performing voltage or current regulation, unlike, for example, an active DC power supply. In some embodiments, the passive resonant converter circuit 110 may be configured to substantially match an output impedance of the ballast 10, thus providing a relatively efficient power transfer and control of power transfer between the ballast 10 and the at least one LED 120. Generally, the current through the at least one LED 120 is a function of the inductance, capacitance and the LED voltage, with the power delivered to the LED being a function of the LED current and voltage.

Figure 2:
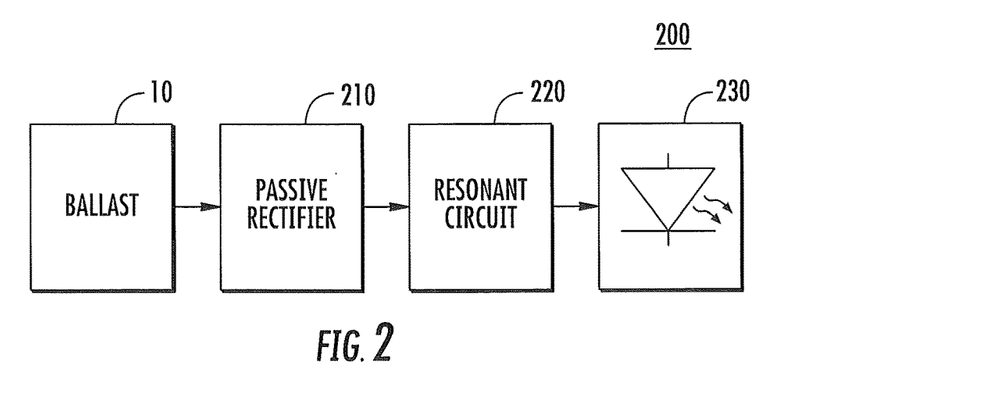
FIG. 2 is a schematic diagram illustrating a lighting apparatus according to further embodiments.

Referring to FIG. 2, a passive resonant converter circuit may comprise a passive resonant rectifier circuit including a combination of a passive rectifier circuit 210 and a resonant circuit 220. As shown in FIG. 2, an input of the passive rectifier circuit 210 may be coupled to a lamp ballast 10, and an input of the resonant circuit 220 may be coupled to an output of the passive rectifier circuit 210. At least one LED 230 may be coupled to an output of the resonant circuit 220. In some embodiments, the arrangement of the rectifier circuit 110 and the resonant circuit 220 may be reversed, i.e., the resonant circuit 220 may be connected to a ballast 10, with the rectifier circuit 210 being connected between the resonant circuit 220 and the at least one LED 230. In some embodiments, the ballast 10 may be an electronic ballast including a resonant AC/AC power supply of the type commonly used in fluorescent, high intensity discharge (HID) and other gas discharge lighting application. The resonant circuit 220 may be configured to provide impedance matching for an output of the ballast 10, which may include, for example, a resonant LC output circuit.

Figure 3:
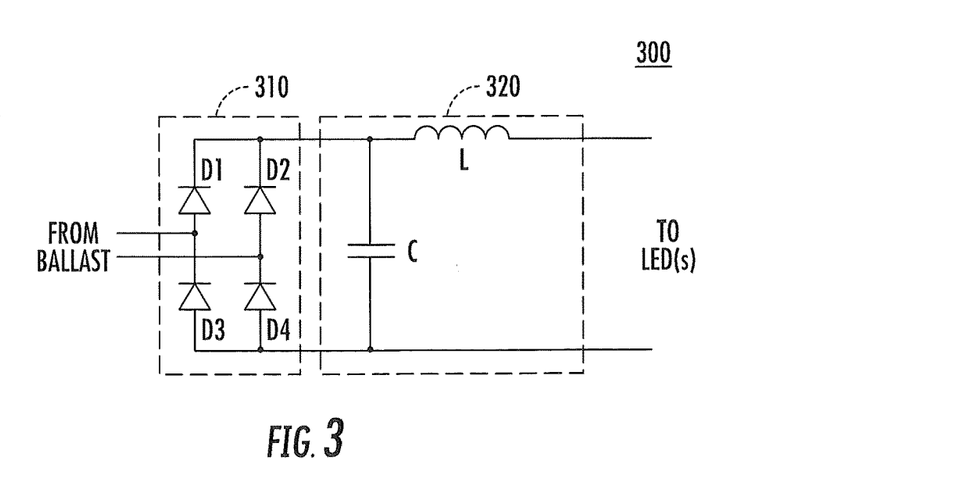
FIG. 3 is a schematic diagram illustrating a passive resonant converter circuit according to some embodiments.

FIG. 3 illustrates an implementation of a passive resonant converter circuit 300 according to some embodiments. The converter 300 includes a passive diode bridge full-wave rectifier circuit 310 including diodes D1, D2, D3, D4. A first port of the rectifier circuit 210 is configured to be coupled to a lamp ballast. A second port of the rectifier circuit 310 is coupled to an input port of a resonant circuit 320. As shown, the resonant circuit 320 includes a CL filter circuit including a capacitor C and an inductor L connected in a parallel/series arrangement. An output port of the resonant circuit 320 is configured to be coupled to at least one LED, for example, a string of serially connected LEDs. It will be appreciated that the rectifier circuit 310 and/or the resonant circuit 320 may take other forms. For example, the resonant circuit 320 may comprise other types of resonant circuits, such as series resonant circuits or other arrangements. In some embodiments, the resonant circuit 320 may be configured to provide impedance matching with a resonant tank output circuit in the ballast.

Figure 4:
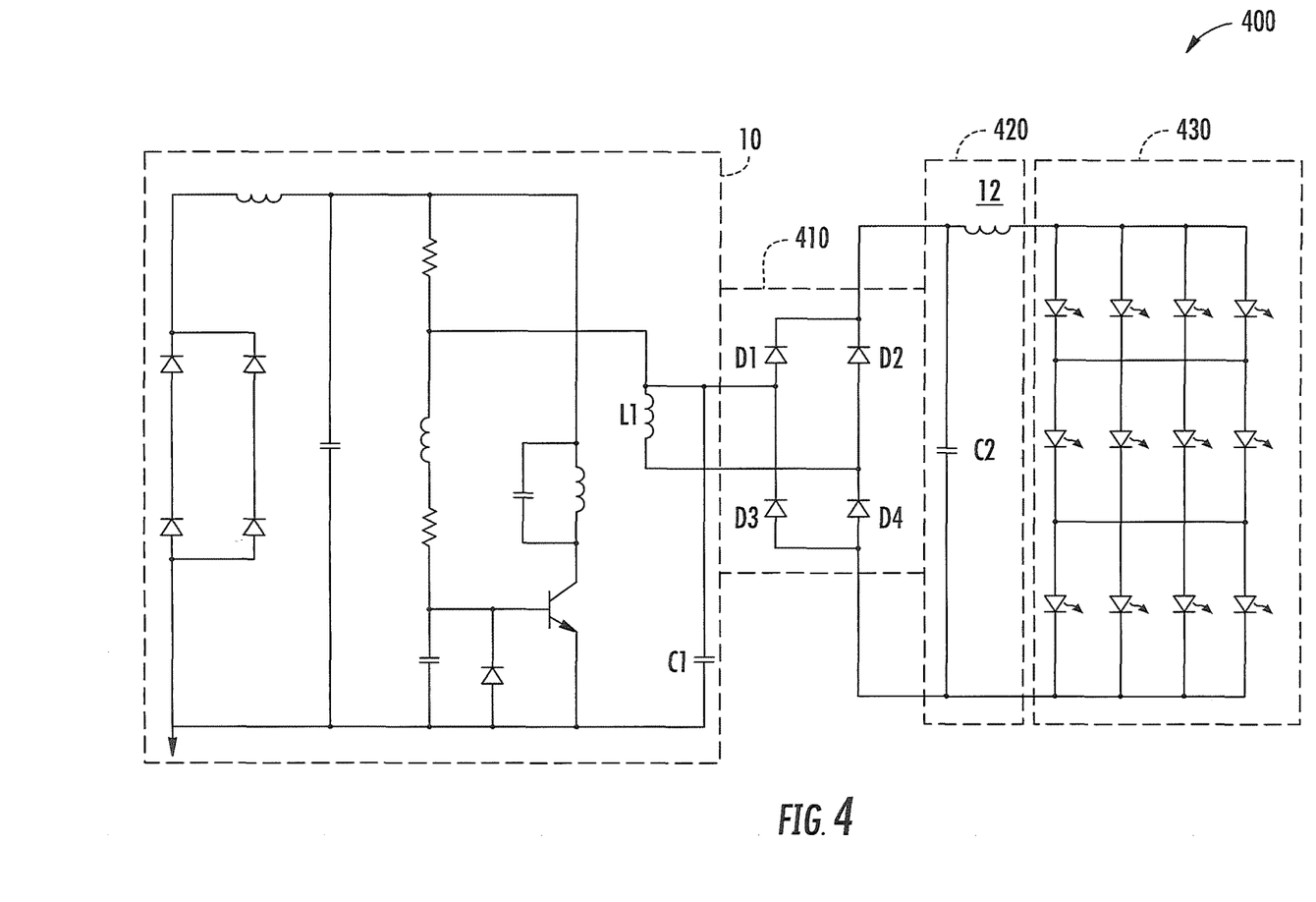
FIG. 4 is a schematic diagram illustrating a lighting apparatus used with a first type of fluorescent lamp ballast according to some embodiments.

FIG. 4 illustrates an example of implementation of a lighting apparatus 400 according to some embodiments with an electronic ballast 10 of a type commonly used in fluorescent lighting fixtures. As shown, the ballast 10 comprises an oscillator circuit having a series resonant output circuit including a capacitor C1 and an inductor L1. The lighting apparatus 400 includes a passive diode bridge full wave rectifier circuit 410 including diodes D1, D2, D3, D4, which is configured to be coupled to the ballast 10. A resonant parallel/series CL circuit 420 including a capacitor C2 and an inductor L2 is coupled to an output of the rectifier circuit 410. An LED lighting assembly 430 including a plurality of serially and parallel connected LEDs is coupled to the resonant circuit 420. Unlike low-pass LC filters in which an inductor is coupled in series with a parallel combination of a capacitor and the load, the resonant circuit 420 is in the form of a CL filter, with the capacitor C in parallel with the output of the rectifier 410 and the inductor L2 in series with the LED assembly 430. The CL form for the resonant circuit 420 may be particularly advantageous because the ballast 10 may have a relatively high source impedance, while the LED assembly 430 may present a relatively low load impedance. Placing the capacitor C between the inductor L2 and the ballast 10 can reduce voltage oscillations and provide additional impedance control.

As further shown in FIG. 4, a blocking capacitor $C_B$ may be connected between the diode bridge and the ballast 10. The blocking capacitor $C_B$ may be used to block lower-frequency AC currents which may be undesirable for the operation of the LED assembly 430. Such a blocking capacitor may also be useful, for example, to prevent use of the lighting apparatus 400 with an older non-electronic ballast that produces a relatively low frequency (e.g., 50/60 Hz) output instead of the significantly higher frequency outputs produced by typical electronic ballasts, which may be more suitable for driving LEDs.

Figure 5:
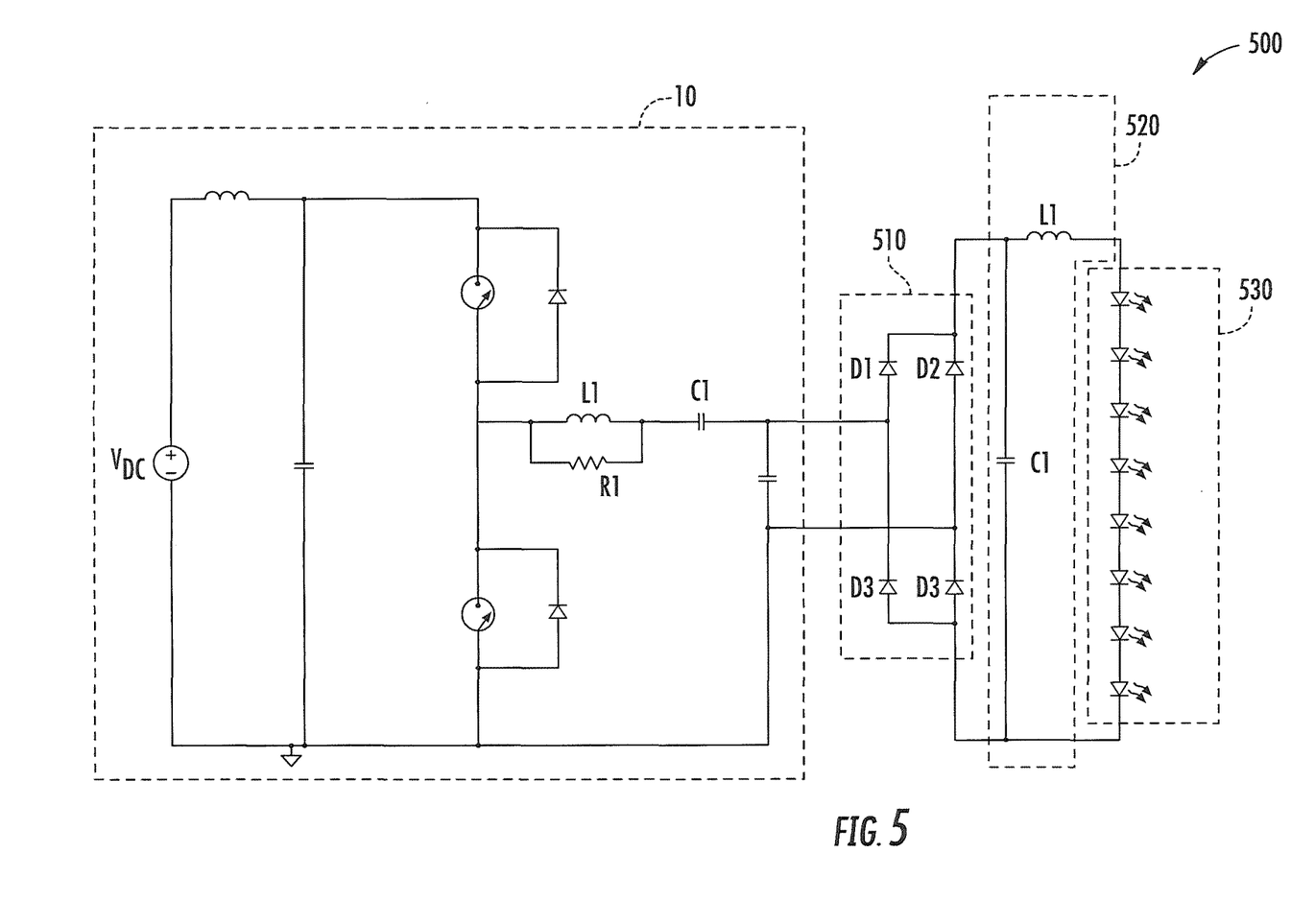
FIG. 5 is a schematic diagram illustrating a lighting apparatus used with a second type of fluorescent lamp ballast according to further embodiments.

FIG. 5 illustrates another lighting apparatus 500 interfaced with another type of electronic ballast 10, which uses a half-bridge output circuit that drives a load through a resonant circuit including an inductor L1 and a capacitor C1 and a resistor R1. The lighting apparatus 500 includes a passive diode bridge rectifier circuit 510 including diodes D1, D2, D3, D4. A resonant circuit 520 including a parallel capacitor C2 and a series inductor L2 couples the rectifier circuit 510 to an LED assembly 530, here shown as a serial string of LEDs. As shown, the apparatus 500 may also include a blocking capacitor $C_B$, which may function as described above with reference FIG. 4.

Figure 6:
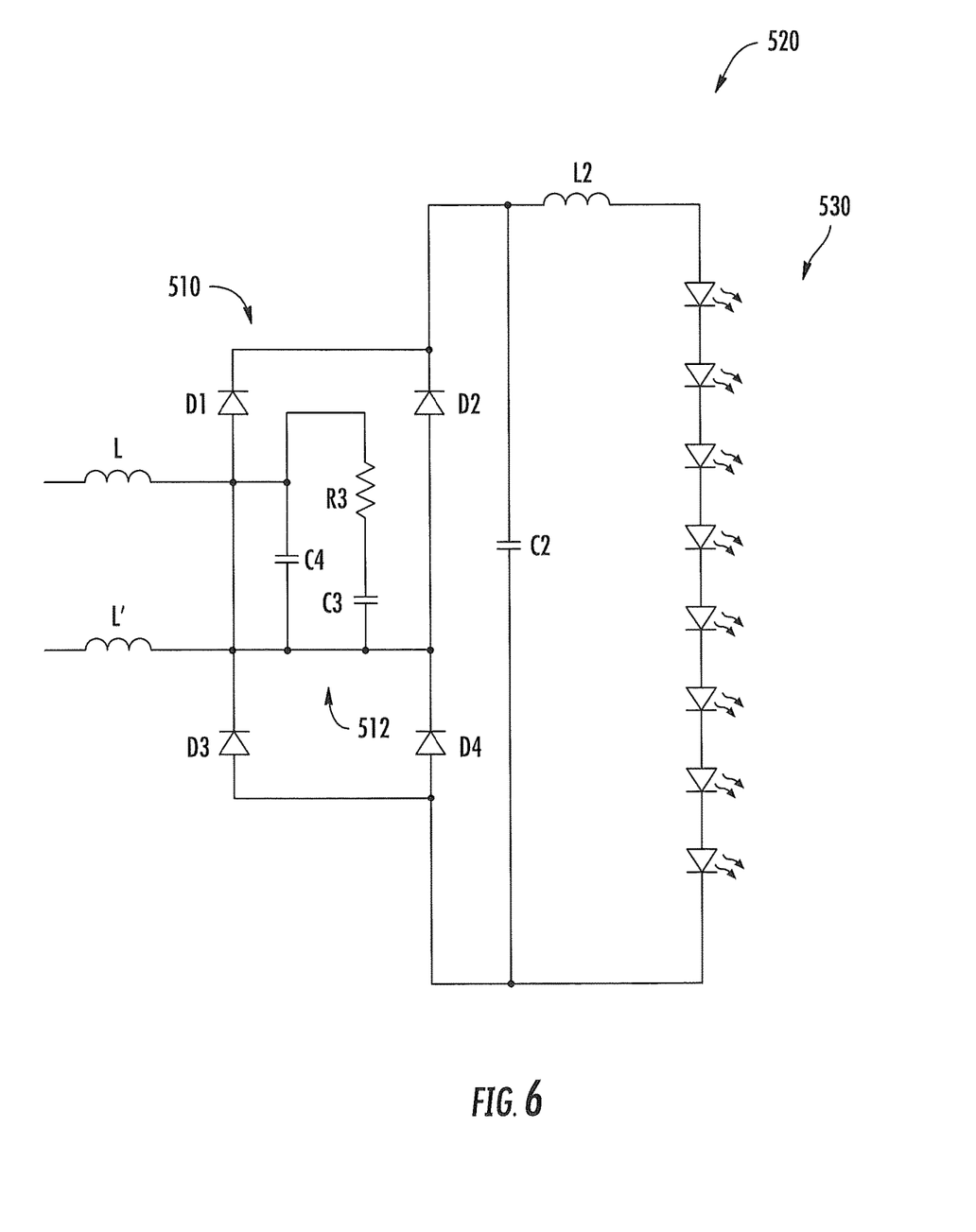
FIG. 6 is a schematic diagram illustrating a lighting apparatus with snubber protection according to further embodiments.

In certain applications, such as in replacement lamp applications in fluorescent troffer-type fixtures, wires leading from the ballast may provide significant inductance, which may lead to undesirable voltages being generated at the input of lighting circuitry configured as described above. According to some embodiments, as shown in FIG. 6, a lighting apparatus 600 may include a rectifier circuit 510 and a resonant circuit 520 that drive an LED assembly 530 along the lines of the circuitry shown in FIG. 5, with the addition of a snubber circuit 512, including a resistor R3, a capacitor C3 and a capacitor C4. The snubber circuit 512 may limit voltage developed across the input of the rectifier circuit 510 due to the inductance L of the wires that couple the apparatus 600 to a ballast.

Figure 7:
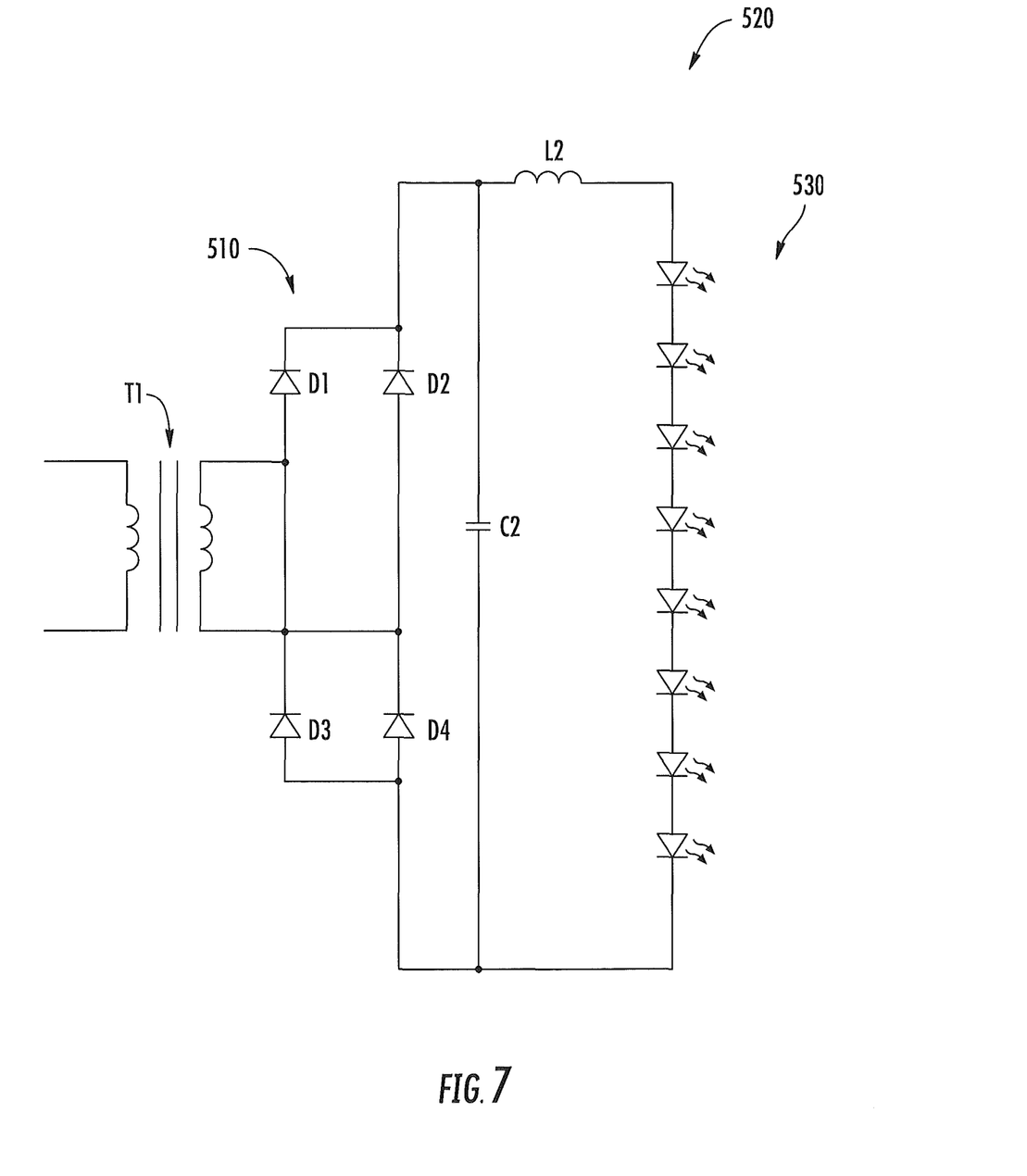
FIG. 7 is a schematic diagram illustrating a galvanic isolation of a lighting apparatus according to some embodiments.

Galvanic isolation may also be provided. For example, as shown in FIG. 7, a lighting apparatus 700 may include a diode bridge rectifier circuit 510, an CL resonant circuit 520 coupled to an output of the rectifier circuit 510, and an LED assembly 530 including a string of LEDs, which may operate as described above. The input of the rectifier circuit 510 is coupled to a ballast using an isolating transformer T1. In particular, a secondary winding of the transformer T1 may be coupled to the input of the diode bridge rectifier circuit 510, and a primary winding of the transformer T1 may be coupled to the output of a ballast.

Embodiments of the inventive subject matter may be arranged in a number of different physical forms. These forms may include, but are not limited to, complete lighting apparatus, replacement lamps, lamp replacement sets (or kits) and/or modules or other circuit assemblies for lamp replacement applications. Replacement lamps may be, for example, plug-in or screw-in replacements for conventional fluorescent tubes, CFLs or other types of lamps that use ballasts that produce AC outputs, such as HID lamps. Lamp replacement kits or sets may include, for example, one or more lamps configured to be plugged or screwed into one or more existing lamp connectors (e.g., screw-in or plug-in sockets, clamps or other electrical connectors), along with circuit modules that are configured to interface the fixture connectors to a ballast using, for example, spliced connections in existing wiring and/or replacement wiring harnesses or sets.

Figure 8:
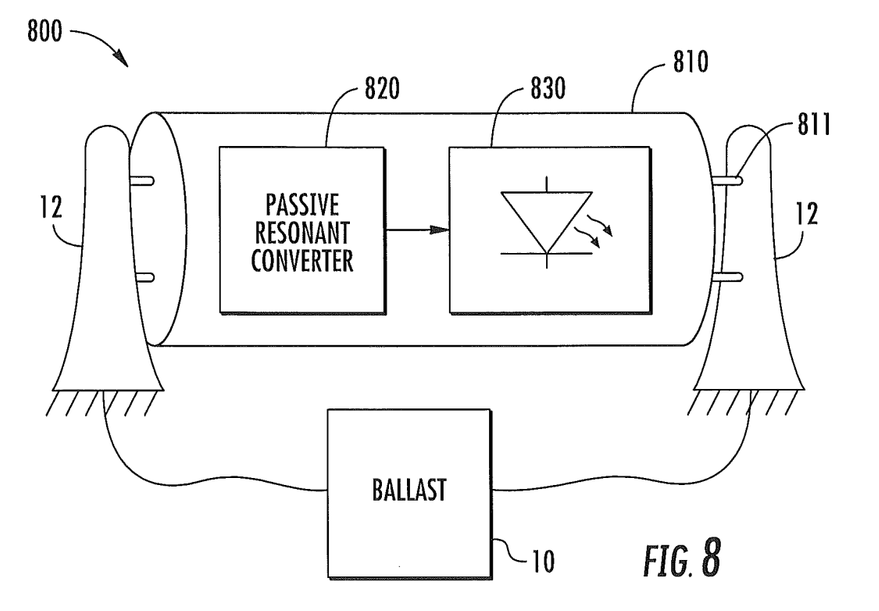
FIG. 8 illustrates a lamp according to some embodiments.
Figure 9:
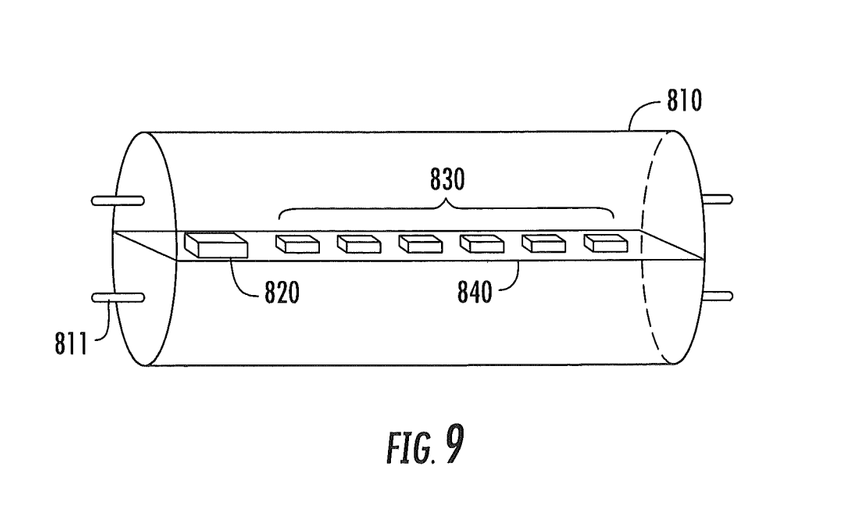
FIG. 9, illustrates a physical arrangement for the lamp of FIG. 8.

For example, FIG. 8 illustrates an LED-based replacement lamp 800 for fluorescent tube lamp replacement. The replacement lamp 800 includes an at least partially translucent housing 810. At least one LED 830 is positioned in the housing 810 and configured to provide illumination through at least one translucent portion of the housing 810. The at least one LED 830 is coupled to an output of a passive resonant converter circuit 820, which may have a form along the lines discussed above. An input of the passive resonant converter circuit 820 is coupled to at least one external contact of the lamp 800, here shown as at least one of pins 811 configured to mate with contacts of lamp sockets 12. The contacts of the lamp socket 812 are coupled to a ballast, e.g., a ballast originally used to drive a conventional fluorescent tube. FIG. 9 illustrates an example of an internal physical layout of the replacement tube 800, including the passive resonant converter circuit 820 and LEDs 820 supported on a substrate 840, e.g., a printed circuit board and/or other supporting structure that provides mechanical support and that facilitates electrical interconnection of these components using, for example, circuit traces and/or wires.

Figure 10:
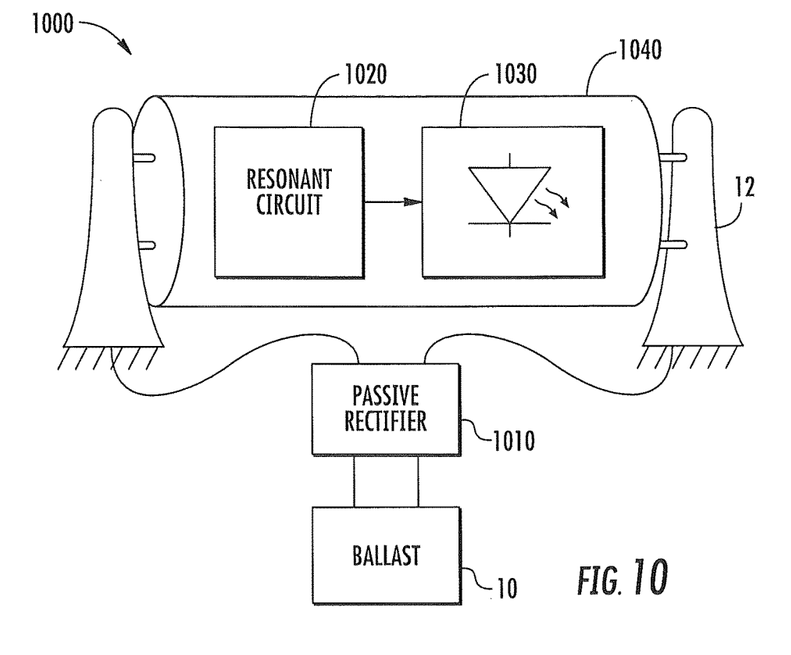
FIGS. 10-12 fluorescent lamp replacement arrangements according to various embodiments.

According to further embodiments, a lamp may be configured to include a portion of a passive resonant converter circuit, with other portions of the passive resonant converter circuit positioned outside of the lamp and connected thereto via wiring, such that the lamp and external circuitry serve as a lamp replacement set or kit. For example, FIG. 10 illustrates a lamp 1000 including at least one LED 1030 and a resonant circuit 1020 (e.g., a resonant CL circuit as described above with reference to FIGS. 3-7) positioned in an at least partially translucent housing 1040. The lamp 1000 is coupled to an external passive rectifier circuit 1010, which may take the form, for example, of a module that may be spliced into existing wiring or otherwise electrically connected to a ballast 10 and lamp sockets 12 in a fluorescent lighting fixture.

Figure 11:
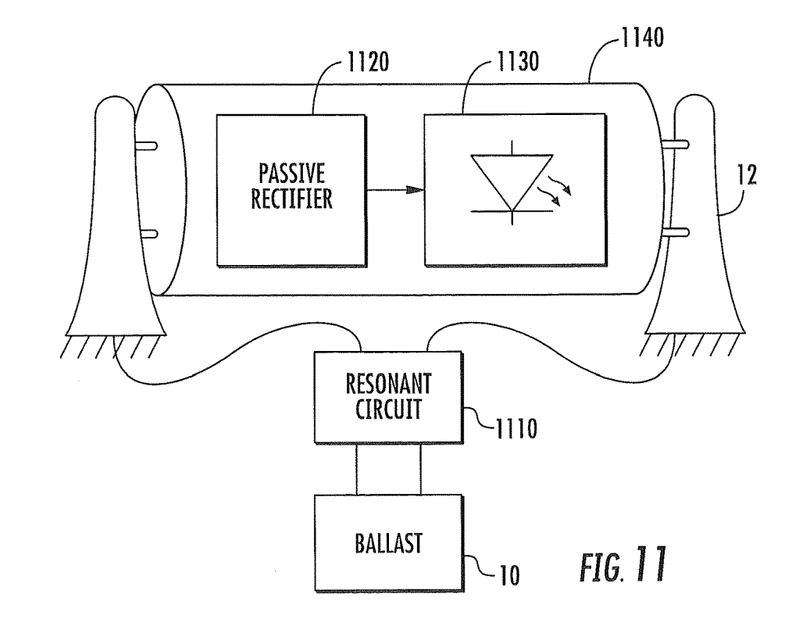

As shown in FIG. 11, a lamp replacement set or kit may include a lamp 1100 which is configured to be connected to lamp sockets 12 and which includes at least one LED 1130 coupled to a passive rectifier circuit 1120 inside a lamp housing 1140. An external resonant circuit 1110 may be coupled to the lamp 1100 via the sockets 12, and may comprise, for example, a module configured to be spliced into existing wiring or otherwise connected between a ballast 10 and the lamp sockets 12.

Figure 12:
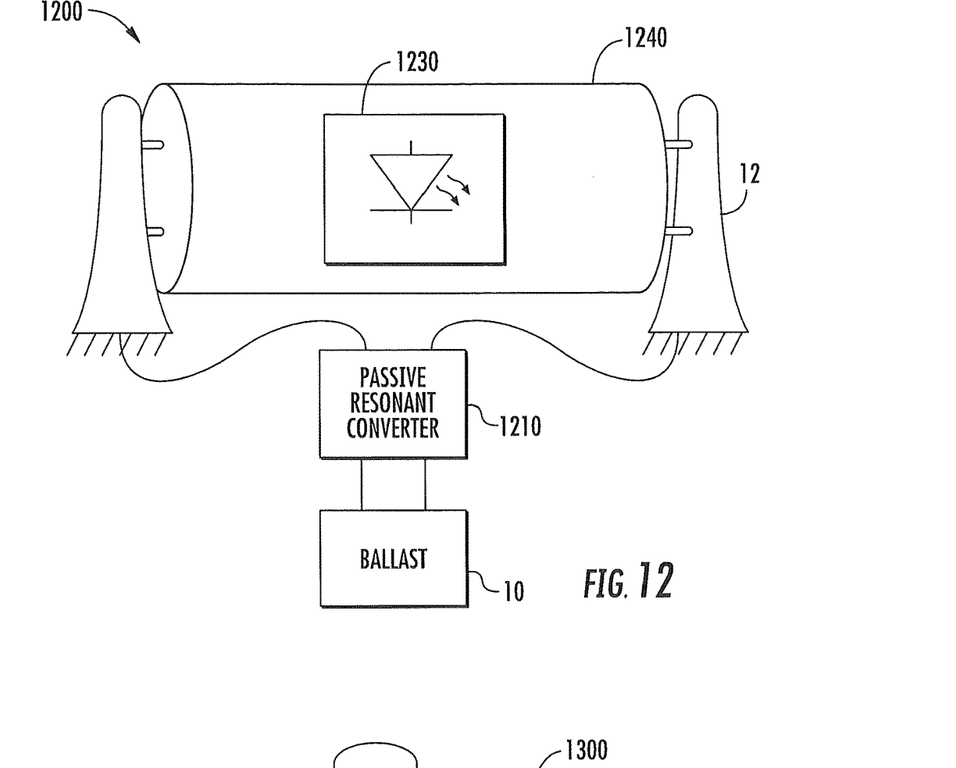

In still further embodiments illustrated in FIG. 12, a lamp replacement set or kit may include a lamp 1200 including at least one LED 1230 positioned in a lamp housing 1240. The at least one LED 1230 may be coupled to a passive resonant converter circuit 1210 along the lines described above via lamp sockets 12. The passive resonant converter circuit 1210 may be configured, for example, as a module configured to be spliced into existing wiring or otherwise connected between a ballast 10 and the lamp sockets 12.

Figure 13:
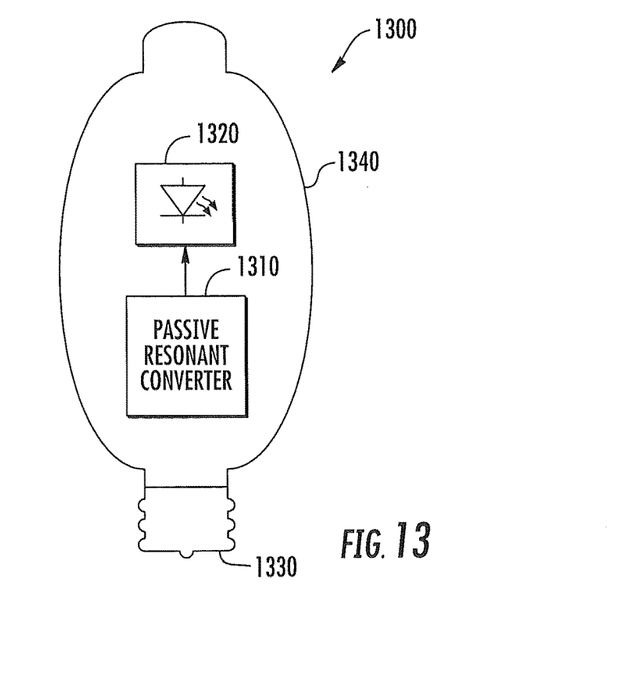
FIG. 13 illustrates a lamp for high intensity discharge (HID) lighting applications according to some embodiments.

As noted above, some embodiments of the inventive subject matter are applicable to other types of ballast-driven lighting devices, including gas-discharge lamp devices such as HID devices (e.g., mercury vapor, metal halide, sodium vapor, xenon arc, etc.), low pressure sodium devices and CFLs. For example, FIG. 13 illustrates an LED replacement lamp for HID lamp devices. The lamp 1300 includes at least one LED 1320 coupled to a passive resonant converter circuit 1310 housed within an at least partially translucent housing 1340. The passive resonant converter circuit 1310 is configured to be coupled to an external ballast via a screw-type base 1330. It will be appreciated that portions of the passive resonant converter circuit could also be positioned external to the lamp 1300, e.g., in one or more modules configured to be connected between the lamp base 1330 and the ballast, in ways analogous to those described above with reference to FIGS. 10-12.

Figure 14:
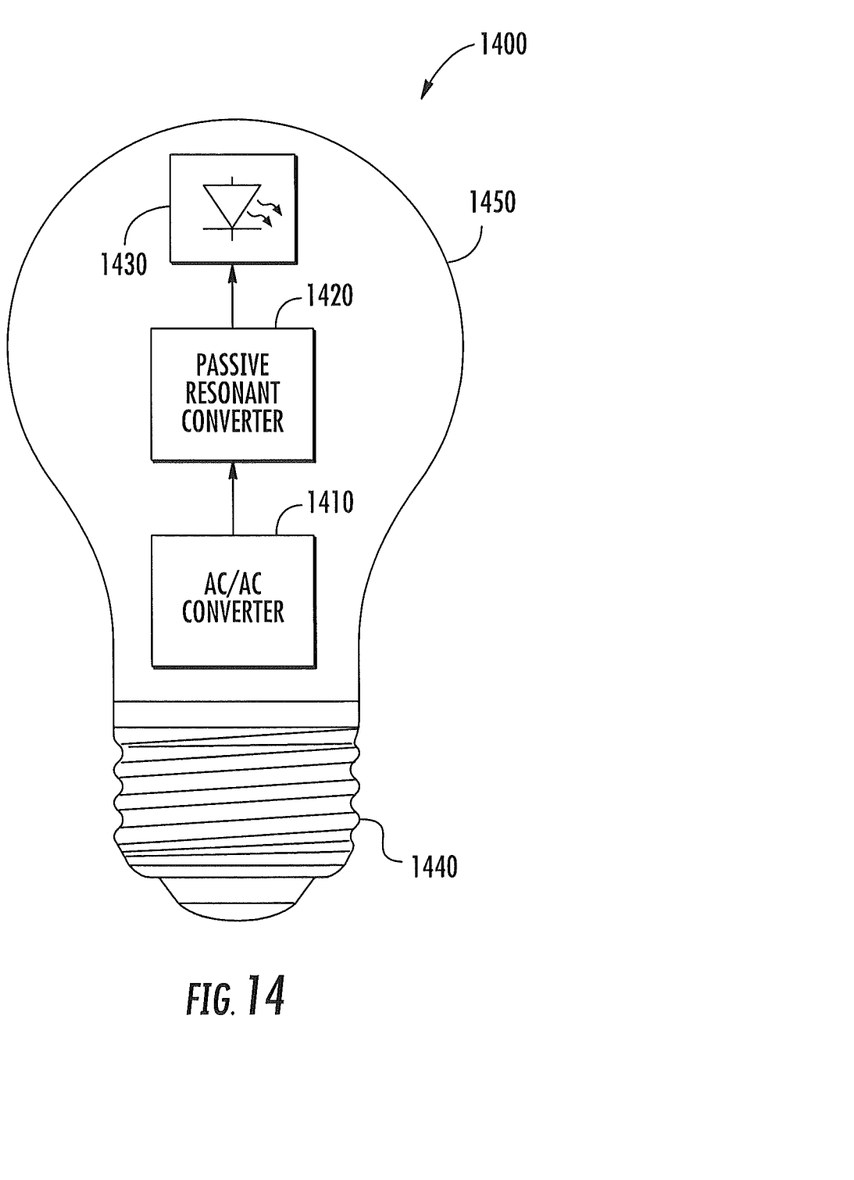
FIG. 14 illustrates an LED lamp according to some embodiments.

In some embodiments, a passive resonant converter circuit along the lines discussed above may be packaged with an AC/AC converter circuit in a lamp or other lighting assembly. For example, as shown in FIG. 14, an AC/AC converter circuit 1410, passive resonant converter circuit 1420 and one or more LED's 1430 may be integrated in a housing 1450 of a lamp 1400 and configured to be coupled to an AC power source through a screw-type base 1440 or via some other electrical connector. The AC/AC converter circuit 1410 may take the form of the ballast circuits 10 shown, for example, in FIGS. 4-5.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. A lighting apparatus comprising:
   at least one light emitting diode (LED); and
   a passive resonant converter circuit having an output coupled to the at least one LED and an input configured to be coupled to a gas discharge lamp ballast that produces an AC output, and comprising a resonant CL circuit comprising:
   at least one inductor coupled in series with the at least one LED; and
   at least one capacitor.

2. The lighting apparatus of claim 1, wherein the passive resonant converter circuit provides no active voltage or current regulation.

3. The lighting apparatus of claim 1, wherein the passive resonant converter circuit comprises a combination of a passive rectifier circuit and the resonant CL circuit.

4. The lighting apparatus of claim 3, wherein an input of the passive rectifier circuit is configured to be coupled to the gas discharge lamp ballast and wherein the resonant CL circuit and the at least one LED are coupled to an output of the passive rectifier circuit.

5. The lighting apparatus of claim 1, wherein the at least one capacitor is between the at least one inductor and the input.

6. The lighting apparatus of claim 5, wherein the resonant CL circuit comprises the at least one capacitor coupled in parallel with the at least one inductor and the at least one LED.

7. The lighting apparatus of claim 1, wherein the at least one LED comprises a string of serially-connected LEDs.

8. The lighting apparatus of claim 1, further comprising at least one capacitor configured to be coupled in series between the gas discharge lamp ballast and the passive resonant converter circuit.

9. The lighting apparatus of claim 1, wherein the at least one LED and at least a portion of the passive resonant converter circuit are integrated in a lamp.

10. The lighting apparatus of claim 1, further comprising an isolation transformer configured to be coupled between the passive resonant converter circuit and the gas discharge lamp ballast.

11. A lamp replacement kit comprising the lighting apparatus of claim 1.

12. The lamp replacement kit of claim 11 comprising a lamp configured to be coupled to a lamp connector, wherein the at least one LED is positioned in the lamp.

13. The lamp replacement kit of claim 12, wherein at least a portion of the passive resonant converter circuit is positioned in the lamp.

14. The lighting apparatus of claim 1, wherein the passive resonant converter circuit is configured to substantially match an output impedance of the gas discharge lamp ballast.

15. A lamp comprising:
a housing;
at least one electrical contact supported by the housing and configured to engage at least one electrical contact in a lamp connector of a gas discharge lighting device;
at least one light emitting diode (LED) positioned in the housing and configured to provide illumination through at least one translucent portion of the housing; and
a passive resonant converter circuit positioned in the housing and having an input coupled to the at least one electrical contact and an output coupled to the at least one LED and comprising a resonant CL circuit comprising at least one inductor coupled in series with the at least one LED and at least one capacitor coupled in parallel with the at least one inductor and the at least one LED, the passive resonant converter circuit configured to transfer power to the least one LED from a lamp ballast connected to the lamp connector.

16. The lamp of claim 15, further comprising an AC/AC converter circuit positioned in the housing, having an input coupled to the at least one electrical contact and an output coupled to the passive resonant converter circuit.

17. The lamp of claim 15, wherein the passive resonant converter circuit provides no active voltage or current regulation.

18. The lamp of claim 15, wherein the passive resonant converter circuit further comprises a passive rectifier circuit, wherein an input of the passive rectifier circuit is coupled to the at least one contact and wherein the resonant CL circuit and the at least one LED are coupled to an output of the passive rectifier circuit.

19. The lamp of claim 15, wherein the at least one LED comprises a string of serially-connected LEDs.

20. The lamp of claim 15, further comprising at least one capacitor coupled in series between the at least one electrical contact and the passive resonant converter circuit.

21. The lamp of claim 15, wherein the resonant CL circuit of the passive resonant converter circuit is configured to substantially match an output impedance of the gas discharge lamp ballast.

22. An apparatus comprising:
an output configured to be coupled to at least one LED;
an input configured to be coupled to a gas discharge lamp ballast that produces an AC output; and
a passive resonant converter circuit coupled to the input and to the output, and comprising a resonant CL circuit comprising:
at least one inductor configured to be coupled in series with the at least one LED; and
at least one capacitor.

23. The apparatus of claim 22, wherein the passive resonant converter circuit supports power transfer from the gas discharge lamp ballast to the at least one LED without active voltage or current regulation.

24. The apparatus of claim 22, wherein the passive resonant converter circuit comprises a combination of a passive rectifier circuit and the resonant CL circuit.

25. The apparatus of claim 24, wherein an input of the passive rectifier circuit is configured to be coupled to the gas discharge lamp ballast, wherein the resonant CL circuit is coupled to an output of the passive rectifier circuit and wherein the output of the passive rectifier circuit is configured to be coupled to the at least one LED.

26. The apparatus of claim 22, wherein the at least one capacitor is between the at least one inductor and the input.

27. The apparatus of claim 26, wherein the resonant CL circuit comprises the at least one capacitor configured to be coupled in parallel with the at least one inductor and the at least one LED.

28. The apparatus of claim 22, further comprising at least one capacitor configured to be coupled in series between the gas discharge lamp ballast and the passive resonant converter circuit.

29. The apparatus of claim 22, wherein at least a portion of the passive resonant converter circuit is packaged in a module configured to be electrically connected between the gas discharge lamp ballast and a lamp connector.

30. The apparatus of claim 22, wherein at least a portion of the passive resonant converter circuit is packaged in a lamp including the at least one LED.

31. A lamp replacement kit comprising the apparatus of claim 22 and the at least one LED.

32. The apparatus of claim 22, wherein the passive resonant converter circuit is configured to substantially match an output impedance of the gas discharge lamp ballast.

* * * * *